June 5, 1956   R. A. RENWANZ   2,748,889
ELECTROSTATIC PRECIPITATOR
Filed June 8, 1955   2 Sheets-Sheet 1
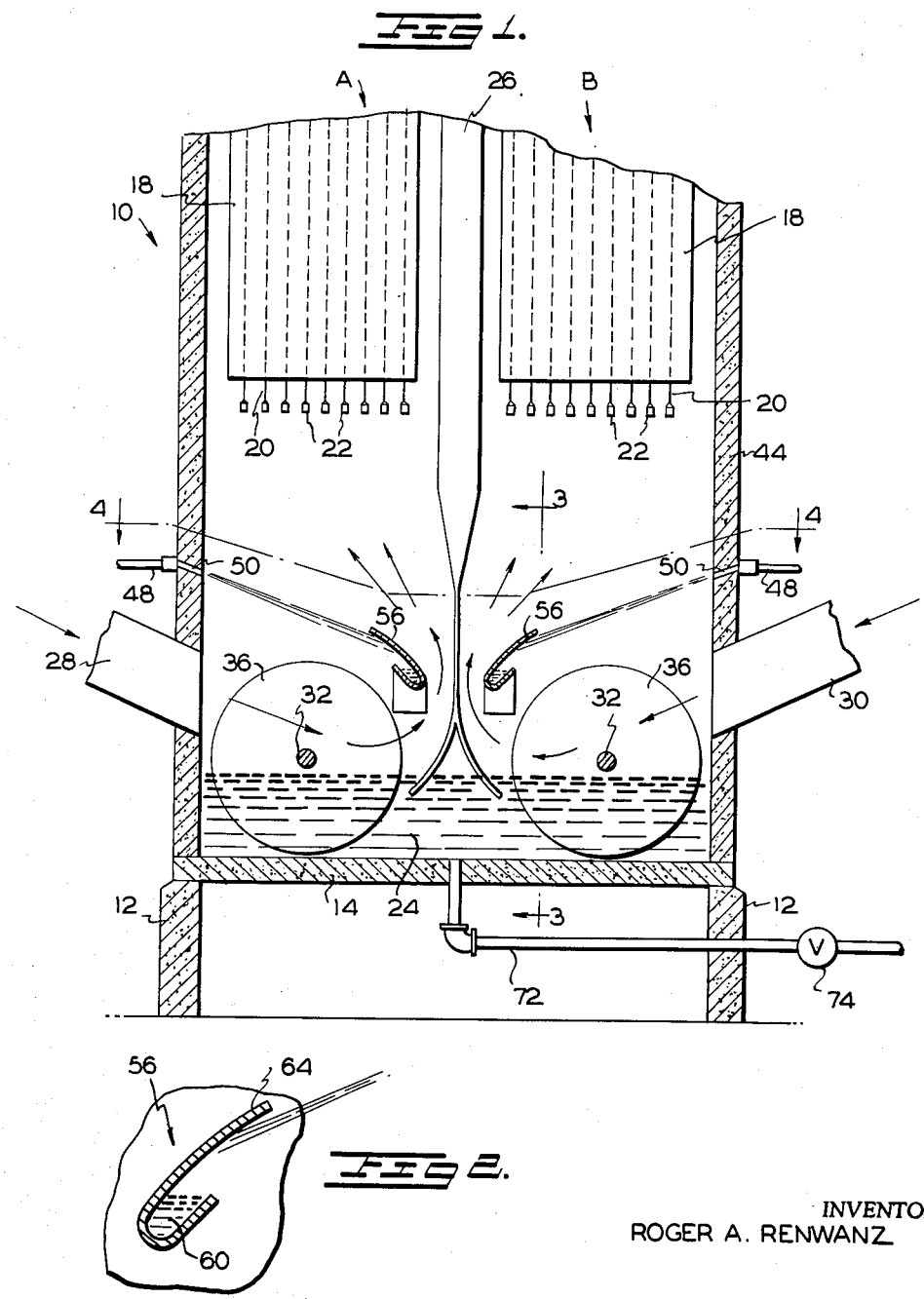
INVENTOR
ROGER A. RENWANZ
BY Harold T. Stowell
ATTORNEY

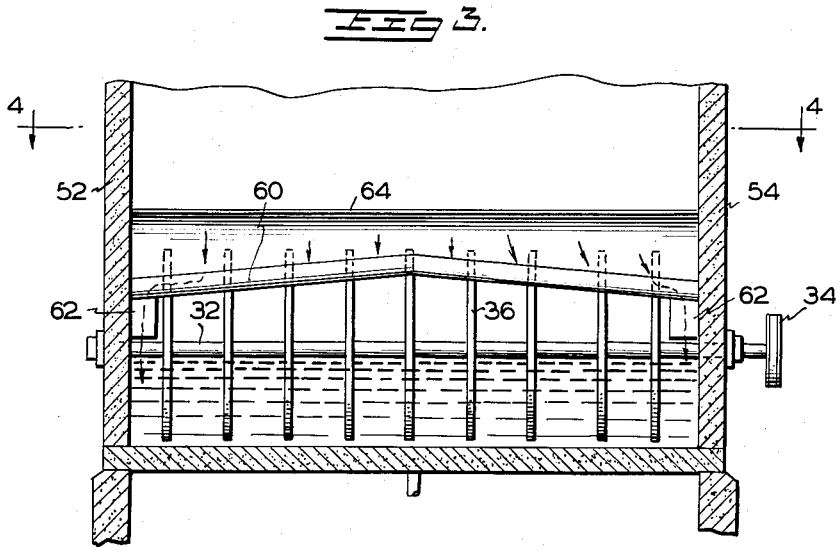
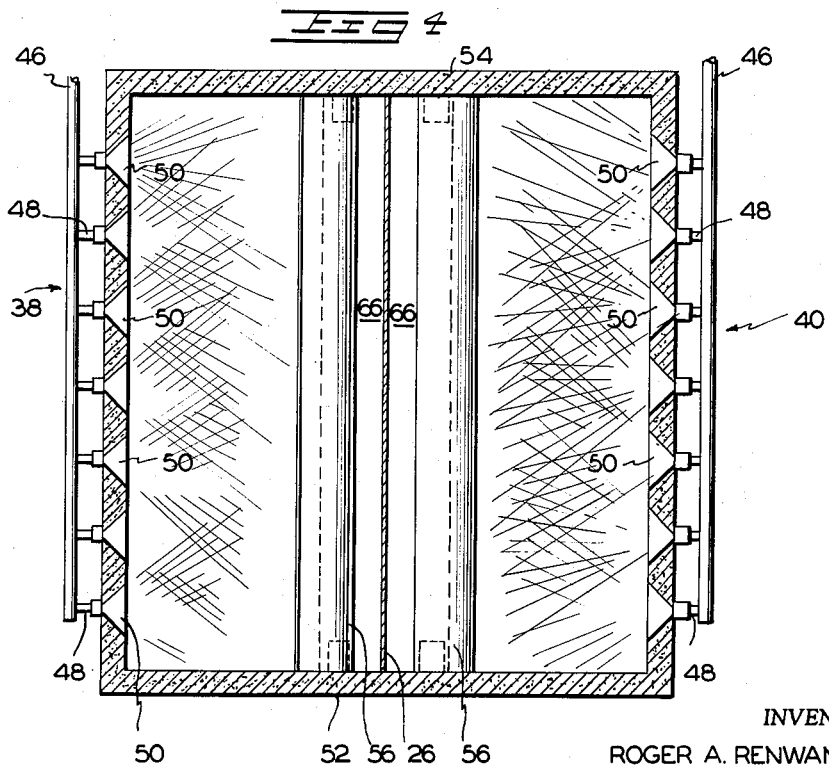

United States Patent Office 2,748,889
Patented June 5, 1956

2,748,889
ELECTROSTATIC PRECIPITATOR

Roger A. Renwanz, Bound Brook, N. J., assignor to Research Corporation, New York, N. Y., a corporation of New York Application June 8, 1955, Serial No. 513,984

2 Claims. (Cl. 183—7)

This invention relates to electrical precipitation apparatus for the separation of suspended particulate materials from gases.

More particularly, the invention relates to apparatus for recovering the dust from flue gases from a furnace burning black liquid in a sulfate process paper mill.

It is a primary object of the invention to provide apparatus for conveniently and economically collecting dust from a stream of hot gases containing suspended particulate matter in the form of a concentrated liquid solution such as described and claimed in U. S. Patent 2,646,132 issued July 21, 1953.

It is an object of the present invention to provide improved apparatus for conducting gases containing suspended particulate material through an evaporator section prior to entering the electrostatic precipitation zone.

It is a further object of the invention to provide improved means for collecting, catching and suspending collected particulate material such as salt cake in a slurry form.

Further objects and advantages of the present invention are to provide such an apparatus that is relatively simple as to its parts and relatively inexpensive to manufacture.

It is also an object of the present invention to provide apparatus for collecting dust recovered from flue gases from furnaces burning black liquor which may be readily employed on existing precipitation apparatus.

The foregoing and other objects and advantages are provided by the present invention which generally comprises an electrostatic precipitator including a casing, complementary collecting and high tension discharge electrodes in the casing, sump means adapted to contain a pool of liquid positioned beneath the complementary electrodes, a member providing an extended evaporating surface, means for moving the member to alternately immerse the surface elements thereof into the liquid in the sump means and to expose the surface elements to the atmosphere above the surface of the liquid in the sump means, means directing a stream of gas to be cleaned to contact with the member above the surface of the pool of liquid and between the complementary electrodes, the means including a dirty gas inlet in the casing between the surface of the pool of liquid and the complementary electrodes and liquid inlet means including a plurality of spray means positioned in the casing between the complementary electrodes and the dirty gas inlet adapted to provide a curtain of liquid extending over the member providing an extended evaporating surface, and liquid outlet means from the sump.

The invention will be more particularly described with reference to the illustrated embodiments of the invention shown in the accompanying drawings in which:

Figure 1 is a fragmentary elevational view of an electrical precipitator of the present invention with parts being broken away to show the interior construction;

Figure 2 is a fragmentary sectional view of the baffle member shown in Fig. 1;

Figure 3 is a section susbtantially on line 3—3 of Fig. 1; and

Figure 4 is a section substantially on line 4—4 of Fig. 1.

Black liquor is obtained in the sulfate pulp process from the pulp digestors after separation from the digested wood or lignocellulose material. The weak black liquor contains many valuable chemicals, including sodium sulphate, and considerable dissolved organic material. In the recovery system described, for example, in U. S. Patent 2,646,132, the black liquor is reduced to a concentration at which it will ignite and it is thereafter burned in a furnace to oxidize and volatilize the organic material and water and to reduce the sodium sulfide. The sodium sulfide is recovered from the furnace ash and, after purification, is generally re-used in the digestion of further quantities of wood chips.

Generally the first step of concentration of the weak black liquor is performed in a conventional evaporator from which the more concentrated black liquor is conducted to an electrical precipitator wherein further concentration is affected. When the black liquor reaches the concentration at which it will ignite, it is fed into a suitable furnace and the fume issuing therefrom is conducted to the electrostatic precipitator wherein the suspended particulate material is separated and added to concentrated black liquor.

The present invention deals with apparatus for fortifying the concentrated black liquor and separating the suspended particulate materials from the gas stream issuing from the stacks of black liquor ignition furnaces.

Referring to the drawings, the electrical precipitator shown and generally designated by the numeral 10 is preferably mounted on concrete or steel piers 12. The precipitator is provided with a tile or concrete shell and casing including a bottom 14 of steel or concrete, and a top of suitable material.

Suspended in the casing are parallel plate type collecting electrodes 18, and a plurality of complementary high-tension discharge electrodes 20 which are suspended from insulated supports not shown in the drawing in the usual way and tension by weights 22 attached to the lower ends thereof.

In the form of the apparatus shown in the drawings, two precipitator sections A and B are provided and directly below the sections there is provided a sump in which is maintained a pool 24 of black liquor. A partition generally designated 26 extends between the precipitator sections A and B terminates below the normal liquid level in the sump whereby gases to be cleaned entering the dual dirty gas inlets 28 and 30 are directed to precipitator sections A and B, respectively.

Extending transversely over the pool of black liquor is a plurality of spaced, parallel shafts 32 that are journalled in bearings in the precipitator side walls 52 and 54. The shafts are rotated, for example, by a pulley and belt system 34. Each shaft 32 carries a plurality of disc-like members 36 secured to the shafts in parallel spaced relationship. The discs 36 have their lower portions immersed in the pool of black liquor 24 and their upper portions exposed to the gas stream entering the dirty gas inlets 28 and 30 positioned above the discs. Between the tops of the dirty gas inlets 28 and 30 and below the lower ends of the electrostatic precipitator sections A and B are a plurality of spray devices generally designated 38 and 40. Spray devices 38 are provided in the precipitator side walls 42 while spray devices 40 are positioned in the side wall 44.

The spray devices 38 and 40 include headers 46 and conduits 48 which terminate within the precipitator casing at spray heads 50.

The spray heads 50 are of the type adapted to provide a thin curtain of liquid which extends over the discs 36 toward the baffle member 26 below each of the precipitator sections A and B.

The number of spray heads 50 and the shape of the liquid curtain issuing therefrom are so provided that a substantially uniform layer of liquid extends between the side walls 52 and 54 of the precipitator casing.

Adjacent the baffle member 26 is provided a pair of curved baffle members 56 positioned on each side of the baffle 26. Each curved baffle 56 terminates at its lower end in a trough-like formation 60 which trough as more clearly shown in Fig. 3, slopes generaly from substantially the medial line thereof downwardly toward the side walls 52 and 54 to outlets 62 which drain into the black liquor pool 24. The upper or leading edge 64 of the baffles 56 extend generally toward the spray devices 38 and 40 and are so positioned that the curtain of spray strikes the inner curved surface thereof and drains through troughs 60 to outlet conduits 62. It will further be seen from Figs. 1 and 4 that the baffles are spaced from and extend parallel to the partition member 26 to provide a restricted gas passage 66 communicating with the gases entering dirty gas inlets 28 and 30 and the precipitator sections A and B, respectively.

In operation of the electrostatic precipitator of the present invention, gases containing fume from, for example, black liquor ignition furnaces are directed to dirty gas inlets 28 and 30. The hot gases are caused to flow between the disc evaporators 36 by the partition member 26, the baffles 56 and the curtains of black liquor provided by the sprays 50 which are fed through supply conduits 46 connected to a source of concentrated black liquor.

As the gas entering the dirty gas inlets 28 and 30 passes between the surfaces of the discs 36, the black liquor in the sump 24 is fortified since as the discs 36 rotate the hot furnace gases evaporate a substantial portion of the water from the black liquor, the evaporation occurring both at the free surface of the liquid pool and from the extended liquor films formed on the unsubmerged surfaces of the discs.

The gases, after passing the rotating disc evaporators 36, pass between the partition member 26 and the baffles 56 and enter the precipitator zones A and B where suspended organic material and salt cake is collected on the collecting electrodes 18. Suitable rapping devices, not shown in the drawings, periodically cause the collected material on the collecting plates 18 to be discharged into the curtain of black liquor formed by the sprays 50.

The larger particles of the collected material are wetted in passing through the curtain of black liquor and are deposited in the concentrated black liquor in the pool 24, while the smaller particles are carried by the curtains of black liquor into the troughs and drain into the pool 24 through outlets 64 whereby the concentration of the black liquor in the pool 24 is substantially increased. The concentrated and fortified black liquor is withdrawn from the pool 24 through outlet conduit 72 which may be provided with automatic or manual control valve means 74 whereby the level of the liquid in the sump may be maintained substantially constant.

From the foregoing description, it will be seen that the present invention provides new and useful improvements in the electrical precipitation of gases containing suspended particulate materials and it is apparent that various changes may be made in the apparatus shown and described by way of illustration without departing from the invention. For example, the apparatus shown in the illustrated embodiments of the invention is described with reference to treating gases issuing from furnaces burning concentrated black liquor in a sulfate paper mill; however, the apparatus is well suited for the treatment of hot gases containing other forms of soluble dust or the treatment of gases containing insoluble particulate materials that are desired to be collected in the form of sludges, semi-liquids and the like.

I claim:

1. An electrostatic precipitator comprising a casing, complementary collecting and high-tension electrodes in said casing, sump means adapted to contain a pool of liquid positioned beneath said complementary electrodes, a member providing an extended evaporating surface, means for moving the member to alternately immerse surface elements thereof into the liquid in the sump means and to expose the surface elements to the atmosphere above the surface of the liquid in the sump means, means directing a stream of gas to be cleaned into contact with the member above the surface of the pool of liquid and between the complementary electrodes, said means including a dirty gas inlet in one side of said casing between the surface of the pool of liquid and the complementary electrodes, liquid spray means connected to a source of liquid positioned in said wall of said casing between the upper end of the dirty gas inlet and the lower end of the complementary electrodes positioned to direct a curtain of liquid toward the opposite wall of said casing and extending over said member providing the extended evaporating surface, a baffle extending parallel with said other wall of said casing and spaced therefrom in the path of the curtain of liquid provided by the plurality of spray means, trough means provided at the lower end of said baffle for conducting the spray liquid into the pool of liquid beneath the complementary electrodes and liquid outlet means from said sump.

2. An electrostatic precipitator comprising a casing, complementary collecting and high-tension discharge electrodes in said casing, sump means adapted to contain a pool of liquid positioned beneath the complementary electrodes, a plurality of vertically disposed disc members rotatably mounted in said sump means, means for rotating said disc members to bring successive surface elements thereof into and out of the pool of liquid in said sump means, means directing a stream of gas to be cleaned into contact with the exposed surfaces of the disc members and then between the complementary electrodes said means including a dirty gas inlet in said casing positioned between the surface of the liquid in the sump means and the complementary electrodes, liquid inlet means including a plurality of spray means positioned in said casing between the complementary electrodes and said dirty gas inlet adapted to provide a curtain of liquid extending over said disc members, and a baffle extending parallel to a side wall of the casing in the spray path of said spray means, trough means provided at the lower end of said baffle for conducting the liquid from said spray means into the pool of liquid contained in the sump means, said baffle member positioned in spaced relation to said side wall to provide a passage for gases to be cleaned from beneath the curtain of liquid to the complementary electrodes and means for conducting liquid from said sump.

References Cited in the file of this patent

UNITED STATES PATENTS

| | | |
|---|---|---|
| 2,031,437 | Vincent | Feb. 18, 1936 |
| 2,646,132 | Beaver | July 21, 1953 |
| 2,667,941 | Ekstrom | Feb. 2, 1954 |